Figure 1:
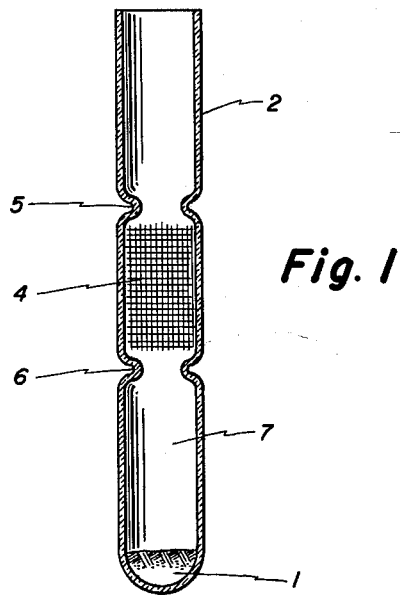

Oct. 27, 1964  M. R. HERTZ  3,154,501

POLONIUM COMPOUND HEAT SOURCES

Filed July 2, 1963

INVENTOR.
Martin R. Hertz
BY

Attorney

United States Patent Office 3,154,501
Patented Oct. 27, 1964

3,154,501
POLONIUM COMPOUND HEAT SOURCES
Martin R. Hertz, Kettering, Ohio, assignor to the United States of America as represented by the United States Atomic Energy Commission
Filed July 2, 1963, Ser. No. 292,795
8 Claims. (Cl. 252—301.1)

The present invention pertains to radioactive heat sources and more particularly to such which may be utilized in connection with direct conversion of heat to electric energy. Such direct conversion systems are useful for employment as batteries or power supplies in satellites, space vehicles, etc., where freedom from trouble, small size, light weight and high reliability are much desired.

United States Patents such as Nos. 2,844,639 and 2,913,510 disclose examples of direct conversion systems and bring out that the heat source may be such as the radioisotopes polonium-210, polonium-208, strontium-90. Polonium-210 has one of the highest specific heat outputs (about 142 watts per gram) of heat source materials considered for isotope powered electrical generators, with a half-life of 148.4 days, low gamma activity, and the advantage of decaying to non-radioactive lead-206, but there are certain practical objections to its use.

In the fabrication of polonium-210 heat sources a platinum gauze is electroplated with a desired quantity of polonium-210 metal, the polonium-210 is evaporated from the platinum gauze into a tantalum capsule which is sealed shut by heliarc fusion welding after being loaded with an appropriate number of curies of polonium, and one or more of the capsules may be placed into an outer container which is also shut by heliarc fusion welding. Such assemblies have operated at temperatures of about 800° C.

The above-noted procedures and assembly pose several practical problems, even with the precaution of handling the containers in cooling blocks due to their high heat production (32 watts per kilocurie). For example, loss of precious polonium material from the inner capsule during transfer from the evaporation apparatus to the point of weld closure has been appreciable largely due to vapor pressure of the polonium. Polonium contamination of weld areas often resulted in welding failures and acceptable encapsulation was not always achieved. If successful encapsulation is achieved the polonium-210 atmospheric pressure boiling point of 962° C. makes feasible, but still objectionable due to excessive vapor pressure, heat sources providing they are maintained at low temperatures, e.g., 800° C. or lower.

The relatively high vapor pressure of the polonium has been a detriment which becomes particularly significant as higher operating temperatures are attempted or approached. These higher operating temperatures are much to be desired for electrical output increases very significantly (approximately exponentially) with resulting increased temperature differences between cooperating hot and cold junctions of a generating assemblage. At temperatures of 1400° C. to 1500° C. the vapor pressure of polonium-210 metal would be about 10 atmospheres (150 pounds per square inch), while the strength of most materials considered and suitable for containment is greatly decreased. For reasons such as those noted stable polonium compounds or substances have been sought with relatively high melting points (not less than around 1400° C. or 1500° C., and preferably higher) and with unobjectionable vapor pressures at such temperatures. Compounds such as ZnPo, PbPo, PtPo$_2$, NiPo, NiPo$_2$, Ag$_2$Po, BePo, CaPo, Na$_2$Po and MgPo have been found not to be stable to even 1000° C.; they decompose into the elements from which they were formed at temperatures lower than 1000° C. Further, at best many of such latter compounds have objectionable vapor pressures, along with the low decomposition temperatures.

The present invention aims to overcome the above and other disadvantages or drawbacks by providing new and improved radioactive materials, suitable for use as heat sources, and method of making such materials, of relatively high temperature melting points and low vapor pressures at such temperatures, which may be more readily fabricated and incorporated into suitable configurations or containers, and with less hazard to personnel.

A principal object of the present invention is to provide radioactive heat source materials of relatively high melting points.

Another object of the invention is to provide radioactive heat source materials of relatively low vapor pressures.

Still another object of the invention is to provide radioactive heat source materials which may be encapsulated more readily and with less hazard to personnel.

Another principal object of the invention is to enable employment of thinner container materials for encapsulating the new heat source compounds, due to their lowered vapor pressures.

A further object of the invention is to provide improved radioactive heat source materials which may be employed with less loss than previously in encapsulation.

A still further object of the invention is to provide improved radioactive heat source materials, and method of making, which serves to minimize welding contamination and other problems.

A further object of the invention is to provide new and improved heat sources.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. These are not intended to be exhaustive nor to limit the invention to the precise form disclosed but are chosen and described in order to best explain the principles of the invention and application in practical use to thereby enable others skilled in the art to best utilize the invention in various embodiments and modifications as are best adapted to the particular use contemplated.

Figure 2:
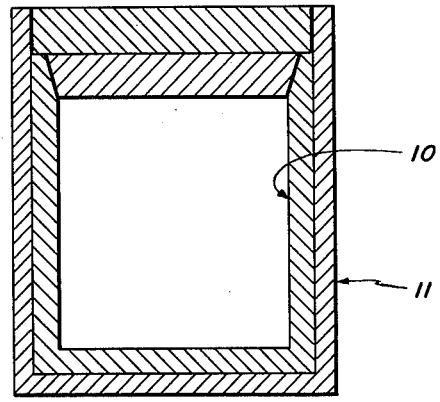

In the accompanying drawings:

FIG. 1 is an enlarged sectional view illustrating an assemblage for use in manufacturing the new material and heat source; and FIG. 2 is an enlarged sectional view illustrating one form of heat source container.

In attempting to overcome the noted and other disadvantages it has been discovered that combinations of polonium-210 with certain of the rare earths and related elements provide refractory or ceramic-like compounds or materials with relatively high melting points and high temperature stabilities, along with desirable low vapor pressures.

In one manner of producing such compounds a quantity of rare earth related element 1 may be placed in a quartz reaction tube 2, one or more platinum gauzes 4 coated (for example by electroplating) with polonium-210 metal inserted into the tube, and the tube evacuated to some suitable low pressure, such as around 10$^{-4}$ milliliter of mercury by known pumping techniques, i.e., by a fore pump and oil diffusion pump. Restriction 5 and constriction 6 may be formed in the reaction tube prior to or after inserting the gauze to position the latter and facilitate compartmentation of the tube. The tube is then closed off at restriction 5 by heating so as to securely seal it. In this sealed condition the tube, and particularly the portion thereof surrounding the gauze 4, is heated in a furnace so that the metal polonium-210 carried by the gauze distills or transfers past the constriction 6 to the portion or chamber 7 and the rare earth 1, after which the constriction 6 is heated to close the tube at this location and prevent migration back of the polonium-210. Thereafter the tube portion 7 with the rare earth element 1 and polonium-210 therein is heated for a time sufficient to react the elements and form the desired polonide compound or system. Subsequently (after the reaction), the unreacted polonium-210 may be distilled to a cooler end of the tube, adjacent constriction 6, to separate the free polonium-210 from this reaction compound; that is, after the reaction part of the reaction tube 2 and its sealed off constriction 6 may be positioned to extend out of the heating furnace (not shown), and the end of the tube with the rear earth compound heated to distill unreacted polonium-210 "back" so as to condense adjacent the cooler portion 6 of the tube. Merely by way of example, successful results have been obtained with quartz tubes about 6 inches long and 9 millimeters' internal diameter.

The resulting polonide compound, generally in the form of a free-flowing powder, may be subsequently removed from the tube and placed into a tantalum (or other containment material) capsule or capsules 10, both preferably while under vacuum or inert atmosphere (e.g., argon) conditions, for enclosure in an outer stainless steel (or other containment material) container 11. The resulting package may be thereafter employed in any desired manner, e.g., as brought out in the referred to United States patents.

The referred to distilling or transferring of polonium-210 may be accomplished at about 800° C., and the heating to react the polonium-210 with the rare earth element may be at about 900° C. to 1000° C. for a suitable period of time. While shortened or optimum times may be arrived at as to the different elements, it has been found that all of the polonides of the present invention may be prepared by heating the rare earth and polonium-210 together at about 1000° C. for about three hours, any free or uncompounded polonium-210 being thereafter distilled to one end of the tube as previously noted.

Elements that have been found to provide very satisfactory and successful compounds with polonium-210 are scandium, yttrium and those of the lanthanum or lanthanide series (lanthanum, cerium, praseodymium, neodymium, samarium, europium, gadolinium, terbium, dysprosium, holmium, erbium, thulium, ytterbium, lutetium), set forth in group III A of the periodic table of the elements as in "Sourcebook on Atomic Energy" by Samuel Glasstone, 1950, page 15 (or group III B at pages 392, 393 of "Handbook of Chemistry and Physics," 36th edition, published by Chemical Rubber Publishing Company), and preferably of high purity. Purities of 99.9% are commercially available. It is logical to assume that promethium, also of the lanthanum or lanthanide series, will likewise provide a satisfactory polonide compound but such has not actually been compounded due to the difficulty of obtaining it and the expense thereof.

The reaction of polonium-210 with the rare earth metals as noted may be achieved by bringing together stoichiometric amounts of the elements, that is, the ratio of about two parts of rare earth to three parts polonium-210, but with quantities of polonium-210 supplied being preferably slightly more than the amount required for a 2 to 3 mole ratio with the noted elements.

In reacting the group III A elements noted with polonium-210, but excepting only promethium, and all at a reaction temperature of about 1000° C. except for praseodymium which was about 900° C., there are achieved rare earth-polonium-210 reaction products with the following melting points, these being measured shortly following completion of the reactions:

| Compound element: | Melting point, °C., ($\pm 50°$ C.) |
|---|---|
| Sc | $\geq 1840$ |
| Y | $\geq 1700$ |
| La | $\geq 1620$ |
| Ce | 1540 |
| Pr | 1442 |
| Nd | 1460 |
| Sm | 1495 |
| Eu | 1670 |
| Gd | 1635 |
| Tb | $\geq 1370$ |
| Dy | 2335 |
| Ho | $\geq 1460$ |
| Er | $\geq 1435$ |
| Tm | $\geq 2040$ |
| Yb | $\geq 2400$ |
| Lu | 1898 |

$\geq$ denotes that temperature is equal to or greater than that given.

The resulting rare earth compounds are stable up to their respective individual melting points and their vapor pressures are negligible or unobjectionable.

As previously noted, the compounds have been recovered as free-flowing powders and hence they may be conveniently used directly from a tube without further processing. Due to their powdery nature the compounds may be used to fill to the desired extent any usual or unusual geometrical shapes to obtain maximum efficiency from heat converting devices. Some of the geometric shapes which may readily receive the "poured" powders include spheres, cones, cylinders, etc. This ready filling feature is a significant advantage over using the polonium metal heretofore available.

As a corollary to the previously set forth objects of the invention it is desired to point out that by reason of these new heat source materials remaining solid and of low vapor pressure at operating temperature the likelihood of their reacting with or diffusing through container materials is at least greatly reduced.

In the reactions of polonium-210 with the rare earths most have gone to about 80% completion or better; those for praseodymium, samarium, lanthanum, lutetium, and yttrium going to 90% completion or better; and that for gadolinium going to better than 95%.

In distilling unreacted polonium-210 to one end of the tube, at about 800° C. to 1000° C., in order to separate it from the polonide reaction compound, the rare earth polonide does not sublime or distill with the free polonium-210, thus showing vapor pressure of the polonides to be significantly lower than vapor pressure of the polonium-210 metal. Compatibility studies of the rare earth polonide with container materials such as tantalum, conducted for as long as 100 hours at about 1000° C., reveal no indication of sublimation or distillation of the new polonide refractory or ceramic compounds. In addition, in the making of melting point determinations the rare earth polonides have been heated to between 1500° C. and 2500° C., with no indication that the polonides sublime or distill during this operation. Such observations bring out that reacting polonium-210 with the rare earths produces compounds with much reduced, low vapor pressures.

The volumes of the reacted products of polonium-210 with europium, terbium, thulium, lutetium, erbium, scandium and yttrium have been found to be not appreciably larger than those of the original rare earth metals. The volumes with lanthanum, praseodymium, samarium, gadolinium, dysprosium and holmium increase, but less than twice the volume of the original rare earth metal. The neodymium, ytterbium, and cerium reactions appear to increase the volume to twice or greater than the original rare earth metals.

Most of the compounds have been found to glow either from the heat of the polonium-210 or from fluorescence caused by alpha bombardment of the rare earth, or both. The europium, lanthanum, gadolinium, and cerium compounds glow dull red; erbium and scandium compounds have a yellow glow; thulium polonide glows yellowish; lutetium polonide has a brilliant green-white glow; and yttrium polonide glows orange. Terbium, neodymium, and ytterbium compounds have not appeared to glow except for fluorescence caused by polonium-210 at locations where the compound touched a quartz reaction tube. Praseodymium, samarium, dysprosium and holmium did not appear to glow.

It will be seen that the present invention provides new and improved heat source compounds or polonides of considerably higher operating temperatures and greatly decreased vapor pressures which may be employed as heat sources in the direct conversion of heat to electrical energy. Due to the higher operating temperatures greatly increased electrical outputs may be obtained by reason of the fact that the electrical output increases approximately exponentially as the temperature difference increases between hot and cold junctions of a generating assemblage. In addition, the herein disclosed polonides may be readily loaded into a variety of geometrical shapes due to being in the form of relatively free-flowing powders. All of these important advantages are afforded without the former contamination difficulties and possible health hazards.

As various changes may be made in the forms, constructions and arrangements herein disclosed without departing from the spirit and scope of the invention and without sacrificing any of its advantages, it is to be understood that all matter herein is to be interpreted as illustrative and not in a limiting sense.

I claim:

1. The method of making a radioactive material for use as a heat source which comprises placing a quantity of polonium-210 and a quantity of at least one element selected from the group consisting of scandium, yttrium and the lanthanides in a container, closing said container, and thereafter heating said container and contents to a sufficiently high temperature as to react said contents to form a compound of polonium-210 with a said element.

2. The method as claimed in claim 1 wherein said heating is conducted at a temperature of about 900° C. to 1000° C.

3. The method as claimed in claim 1 wherein said element is ytterbium.

4. The method as claimed in claim 1 wherein the quantities of polonium-210 and a said element are present in amounts sufficient to produce the compound.

5. The method as claimed in claim 1 wherein said quantity of polonium-210 is such that at least some remains as polonium-210 after said heating.

6. A radioactive material for use as a heat source comprising the reaction product of polonium-210 with at least one element selected from the group consisting of scandium, yttrium and the lanthanides.

7. A radioactive material as claimed in claim 4 wherein said material has a melting point of not less than about 1350° C.

8. A radioactive material for use as a heat source comprising the reaction product of polonium-210 with ytterbium.

References Cited in the file of this patent

UNITED STATES PATENTS

| | | |
|---|---|---|
| 2,844,639 | Jordan | Oct. 20, 1955 |
| 3,058,802 | Kulifay | Oct. 16, 1962 |

OTHER REFERENCES

AED Document MLM–1127, page 57, October 1, 1960.

Chemical and Engineering News, "Oak Ridge Details Sr90 Production," pages 62–64, December 11, 1961.

AEC Documents MLM–1137, page 16, May 31, 1962; MLM–1138, pages 12 and 14, June 29, 1962; MLM–1139, pages 9–10, July 31, 1962; MLM–1140, pages 15–18, August 30, 1962.